US008147196B2

(12) United States Patent
Campbell et al.

(10) Patent No.: US 8,147,196 B2
(45) Date of Patent: Apr. 3, 2012

(54) TURBINE AIRFOIL WITH A COMPLIANT OUTER WALL

(75) Inventors: Christian X. Campbell, Oviedo, FL (US); Jay A. Morrison, Oviedo, FL (US)

(73) Assignee: Siemens Energy, Inc., Orlando, FL (US)

( * ) Notice: Subject to any disclaimer, the term of this patent is extended or adjusted under 35 U.S.C. 154(b) by 448 days.

(21) Appl. No.: 12/435,662

(22) Filed: May 5, 2009

(65) Prior Publication Data

US 2010/0284822 A1 Nov. 11, 2010

(51) Int. Cl.

| | |
|---|---|
| ***B63H 1/14*** | (2006.01) |
| ***B63H 7/02*** | (2006.01) |
| ***B64C 11/00*** | (2006.01) |
| ***F01D 5/08*** | (2006.01) |
| ***F03D 11/02*** | (2006.01) |
| ***F04D 29/58*** | (2006.01) |

(52) U.S. Cl. .................. 416/96 R; 416/97 R; 416/96 A; 415/115

(58) Field of Classification Search .................. 415/115; 416/96 R, 97 R, 96 A See application file for complete search history.

(56) References Cited

U.S. PATENT DOCUMENTS

| | | | | |
|---|---|---|---|---|
| 5,328,331 | A * | 7/1994 | Bunker et al. | 416/96 R |
| 5,484,258 | A * | 1/1996 | Isburgh et al. | 415/115 |
| 6,254,334 | B1 * | 7/2001 | LaFleur | 415/115 |
| 6,261,054 | B1 | 7/2001 | Bunker et al. | |
| 6,511,293 | B2 * | 1/2003 | Widrig et al. | 416/96 R |
| 6,533,547 | B2 | 3/2003 | Anding et al. | |
| 6,808,367 | B1 | 10/2004 | Liang | |
| 7,028,747 | B2 | 4/2006 | Widrig et al. | |
| 7,033,136 | B2 | 4/2006 | Botrel et al. | |
| 7,946,815 | B2 * | 5/2011 | Liang | 416/97 R |
| 2002/0182056 | A1 * | 12/2002 | Widrig et al. | 415/114 |

OTHER PUBLICATIONS

Tewes, W.A., Jr., "Structural Characteristics of Sheet Metal Embossed With an Irregular Design," Navy Marine Engineering Lab Annapolis MD, Apr. 1966, pp. 1-42.

Blosser, M.L, "Bending Stiffness of Multiwall Sandwich," NASA Technical Memorandum 84613, 1983, pp. 1-43, National Aeronautics and Space Administration, Scientific and Technical Information Branch.

* cited by examiner

*Primary Examiner* — Michelle Estrada

(57) ABSTRACT

A turbine airfoil usable in a turbine engine with a cooling system and a compliant dual wall configuration configured to enable thermal expansion between inner and outer layers while eliminating stress formation in the outer layer is disclosed. The compliant dual wall configuration may be formed a dual wall formed from inner and outer layers separated by a support structure. The outer layer may be a compliant layer configured such that the outer layer may thermally expand and thereby reduce the stress within the outer layer. The outer layer may be formed from a nonplanar surface configured to thermally expand. In another embodiment, the outer layer may be planar and include a plurality of slots enabling unrestricted thermal expansion in a direction aligned with the outer layer.

20 Claims, 3 Drawing Sheets

TURBINE AIRFOIL WITH A COMPLIANT OUTER WALL

STATEMENT REGARDING FEDERALLY SPONSORED RESEARCH

Development of this invention was supported in part by the United States Department of Energy, Contract No. DE-FC26-05NT42644. Accordingly, the United States Government has certain rights in this invention.

FIELD OF THE INVENTION

This invention is directed generally to turbine airfoils, and more particularly to hollow turbine airfoils having internal cooling systems for passing fluids, such as air, to cool the airfoils.

BACKGROUND

Typically, gas turbine engines include a compressor for compressing air, a combustor for mixing the compressed air with fuel and igniting the mixture, and a turbine blade assembly for producing power. Combustors often operate at high temperatures that may exceed 2,500 degrees Fahrenheit. Typical turbine combustor configurations expose turbine vane and blade assemblies to these high temperatures. As a result, turbine vanes and blades must be made of materials capable of withstanding such high temperatures. In addition, turbine vanes and blades often contain cooling systems for prolonging the life of the vanes and blades and reducing the likelihood of failure as a result of excessive temperatures.

Typically, turbine vanes are formed from an elongated portion forming a vane having one end configured to be coupled to a vane carrier and an opposite end configured to be movably coupled to an inner endwall. The vane is ordinarily composed of a leading edge, a trailing edge, a suction side, and a pressure side. The inner aspects of most turbine vanes typically contain an intricate maze of cooling circuits forming a cooling system. The cooling circuits in the vanes receive air from the compressor of the turbine engine and pass the air through the ends of the vane adapted to be coupled to the vane carrier. The cooling circuits often include multiple flow paths that are designed to maintain all aspects of the turbine vane at a relatively uniform temperature. At least some of the air passing through these cooling circuits is exhausted through orifices in the leading edge, trailing edge, suction side, and pressure side of the vane.

Often times, the outer wall, otherwise referred to as the dual wall, is formed from inner and outer walls. The walls are rigidly coupled together. The outer wall is exposed to hotter temperatures and, as a result, is subject to greater thermal expansion but is rigidly retained by the inner wall. Thus, stress develops between the inner and outer walls.

SUMMARY OF THE INVENTION

This invention relates to a turbine airfoil usable in a turbine engine with a cooling system and a compliant dual wall configuration configured to enable thermal expansion between inner and outer layers while eliminating stress formation in the outer layer. The compliant dual wall configuration may be formed from a dual wall that is formed from inner and outer layers separated by a support structure. The outer layer may be a compliant layer configured such that the outer layer may thermally expand and thereby reduce the stress within the outer layer. The outer layer may be formed from a nonplanar surface configured to thermally expand. In another embodiment, the outer layer may be planar and include a plurality of slots enabling unrestricted thermal expansion in a direction aligned with the outer layer.

The turbine airfoil may be formed from a generally elongated hollow airfoil that is formed from an outer dual wall and having a leading edge, a trailing edge, a pressure side, a suction side, an outer endwall at a first end, an inner endwall at a second end opposite the first end, and a cooling system positioned in the generally elongated airfoil formed by the outer dual wall. The dual wall may be formed from an outer layer and an inner layer separated from the outer layer by a support structure that allows the outer and inner layers to move relative to each other thereby reducing the buildup of stress between the layers. The outer layer may be formed from a compliant layer configured to distort during thermally expansion.

The compliant layer forming the outer layer may be formed from a nonplanar skin. The nonplanar skin may be formed from a plurality of planar surfaces coupled together at obtuse angles relative to the inner layer. The plurality of planar surfaces may be formed from a plurality of triangular shaped planar surfaces coupled together such that each of the plurality of triangular shaped planar surfaces is positioned at a different angle than adjacent triangular shaped planar surfaces relative to the inner layer.

The support structure between the inner and outer layers may be formed from a plurality of pedestals. The plurality of pedestals may be positioned such that the pedestals contact valleys formed by the plurality of planar surfaces. In another embodiment, the plurality of pedestals may be positioned such that the pedestals contact ridges formed by the plurality of planar surfaces.

In another embodiment of the nonplanar outer layer, the compliant layer may be formed from a plurality of concave and convex surfaces coupled together. The support structure may be formed from a plurality of pedestals, and the plurality of pedestals may be positioned such that the pedestals contact ridges formed by the convex surfaces. During thermal expansion, the valleys may extend radially inward toward inner layer.

The support structure may be formed from a plurality of pedestals, and the outer layer may include a plurality of slots to limit stress buildup in the outer layer due to thermal expansion. In at least one embodiment, at least a portion of the slots are linear. At least a portion of the slots may be aligned with each other. The slots may be positioned such that the outer layer extend uninterrupted between pairs of adjacent pedestals, and the slots may be positioned between pairs of pedestals. Such a configuration enables the outer layer to thermally expand laterally and radially outward without limitation. In another embodiment, at least a portion of the slots may be nonorthogonal to an outer surface of the outer layer. As such, the pathway of flow of the hot gases into the dual wall is more difficult and constrained.

During use, the turbine airfoil may be exposed to the hot gases in the hot gas path of the turbine engine. The outer layer of the airfoil may heat up and undergo thermal expansion. The outer layer may expand differently than the inner layer because the outer layer is separated from the inner layer, thereby allowing the outer layer to become hotter than the inner layer. The configuration of the outer layer allows the outer layer to move relative to the inner layer, thereby preventing the formation of stress within the dual wall between the inner and outer layers. In particular, the outer layer enables the valleys to move inwardly in embodiments in which the ridges are supported with pedestals and enables the ridges to move outwardly in embodiments in which the valleys are supported with pedestals. Thus, little, if any, stress is created within the outer layer.

An advantage of this invention is that the configuration of the outer layer enables the outer layer to thermally expand without restraint from the inner layer.

Another advantage of this invention is that the outer layer may move laterally in a direction that is generally aligned with the outer layer.

Another advantage of this invention is that the pedestals provide cooling channels between the inner and outer layers that enable cooling fluids to be passed therethrough.

These and other embodiments are described in more detail below.

BRIEF DESCRIPTION OF THE DRAWINGS

The accompanying drawings, which are incorporated in and form a part of the specification, illustrate embodiments of the presently disclosed invention and, together with the description, disclose the principles of the invention.

DETAILED DESCRIPTION OF THE INVENTION

Figure 1:
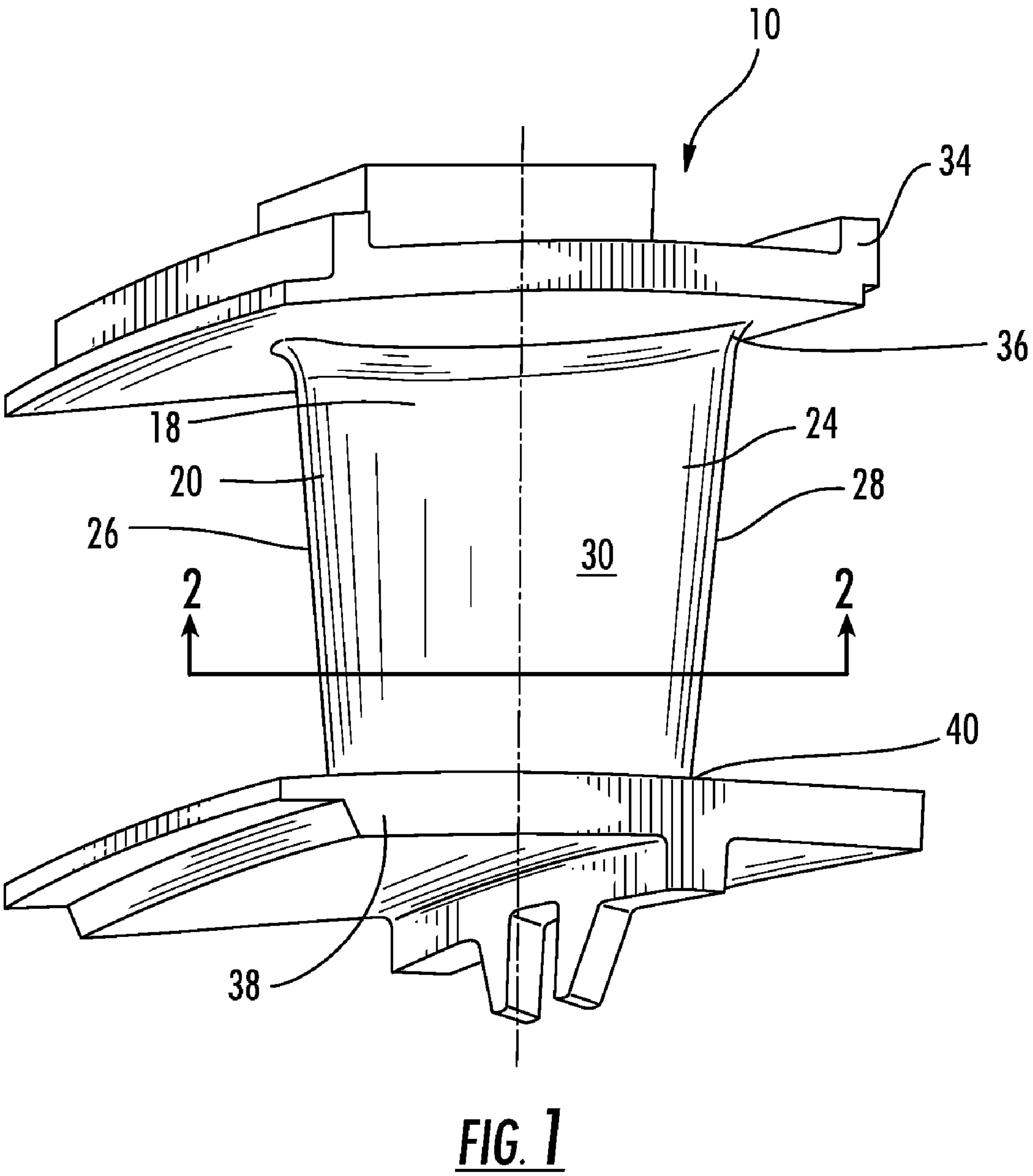
FIG. 1 is a perspective view of a turbine airfoil having features according to the instant invention.
Figure 2:
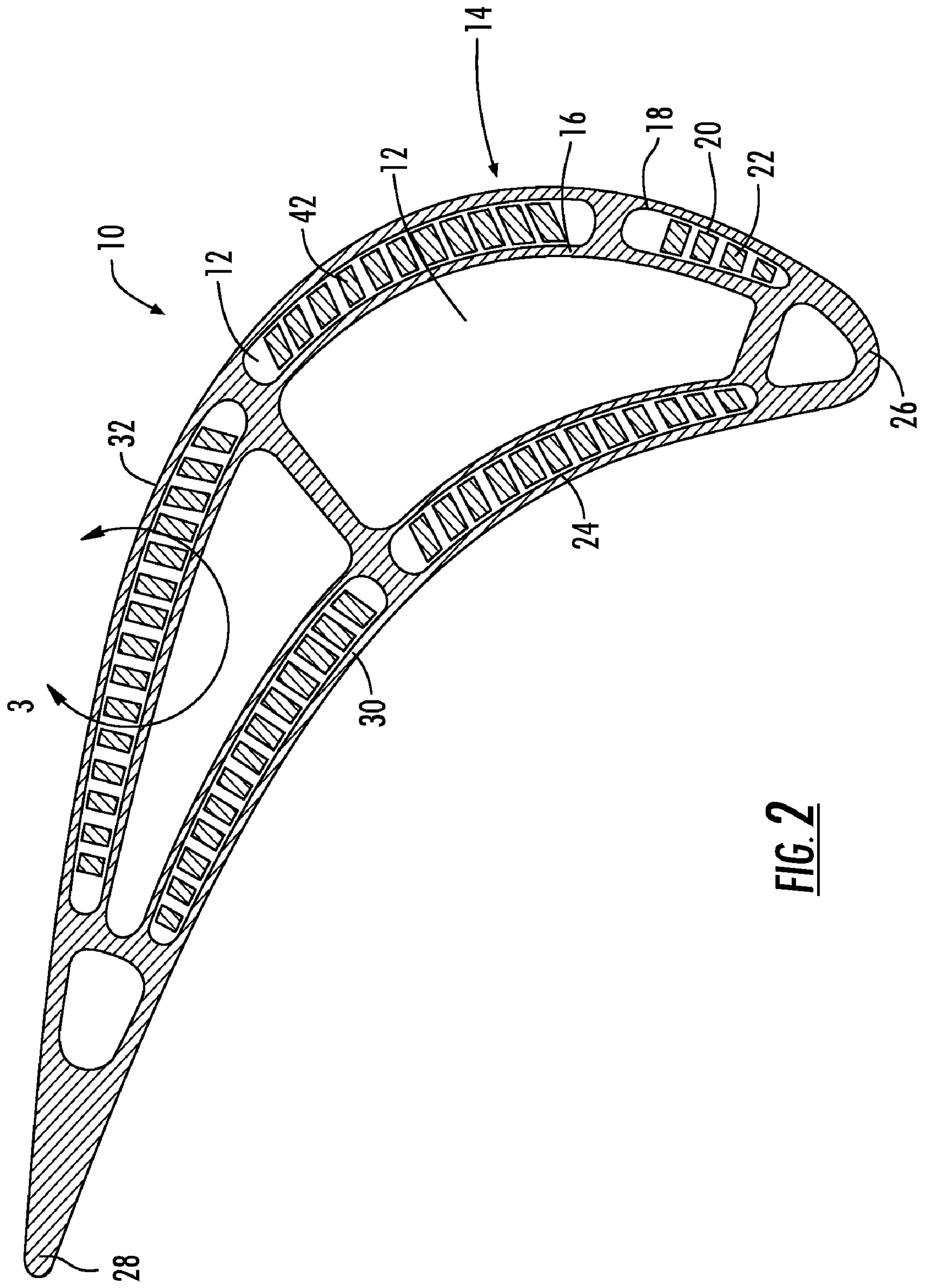
FIG. 2 is a cross-sectional view of the turbine airfoil shown in FIG. 1 taken along line 2-2.

As shown in FIGS. 1-6, this invention is directed to a turbine airfoil 10 usable in a turbine engine with a cooling system 12 and a compliant dual wall configuration 14 configured to enable thermal expansion between inner and outer layers 16, 18 while eliminating stress formation in the outer layer 18. The compliant dual wall configuration 14 may also be used in other turbine components 10, such as, but not limited to, transitions, ring segments, shrouds and other hot gas path structures. The compliant dual wall configuration 14 may be formed a dual wall 20 formed from inner and outer layers 16, 18 separated by a support structure 22. The outer layer 18 may be a compliant layer 44 configured such that the outer layer 18 may thermally expand and thereby reduce the stress within the outer layer 18. The outer layer 18 may be formed from a nonplanar surface configured to thermally expand. In another embodiment, the outer layer 18 may be planar and include a plurality of slots 21 enabling unrestricted thermal expansion in a direction aligned with the outer layer 18.

The turbine airfoil 10 may be formed from a generally elongated hollow airfoil 24 formed from an outer dual wall 20, and having a leading edge 26, a trailing edge 28, a pressure side 30, a suction side 32, an outer endwall 34 at a first end 36, an inner endwall 38 at a second end 40 opposite to the first end 36, and a cooling system 12 positioned in the generally elongated airfoil 24 formed by the outer dual wall 20. In other embodiments, the turbine airfoil 10 may be a turbine blade with a tip at the first end 36 rather than the outer endwall 34. The dual wall 20 may be formed from the outer layer 18 and the inner layer 16 separated from the outer layer 18 by the support structure 22. In at least one embodiment, the support structure 22 may be pedestals 42. The dual wall 20 may form the outer surfaces of the turbine airfoil 10 and may define the outer perimeter of the cooling system 12 positioned within internal aspects of the turbine airfoil 10.

Figure 3:
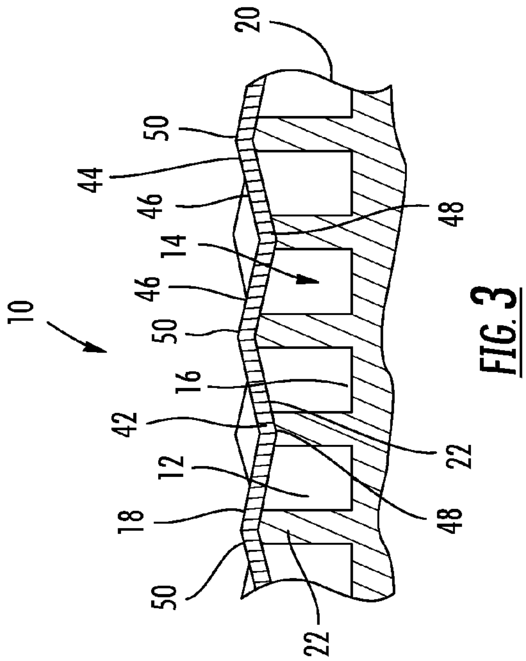
FIG. 3 is a detailed cross-sectional view of the dual wall of FIG. 2 taken at detail 3 in FIG. 2.
Figure 4:
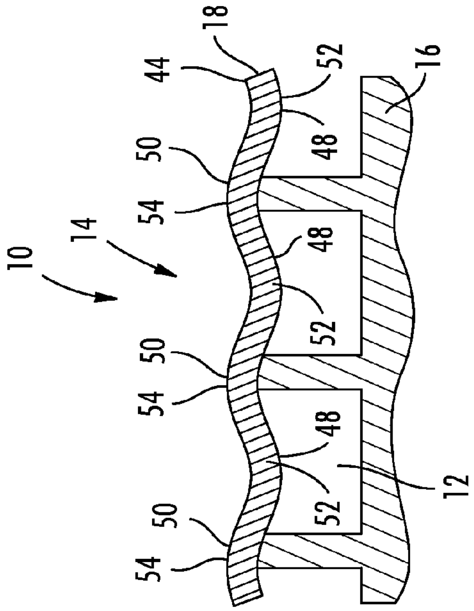
FIG. 4 is a detailed cross-sectional view of an alternative embodiment of the dual wall of FIG. 2 taken at detail 3-3 in FIG. 2.

The dual wall 20 may be formed from an outer layer 18 and an inner layer 16 separated from the outer layer 18 by a support structure 22 that allows the outer and inner layers to move relative to each other thereby reducing the buildup of stress between the layer 16, 18. The outer layer 22 may be a compliant layer 44 configured to distort during thermally expansion. In at least one embodiment, as shown in FIGS. 3 and 4, the compliant layer 44 forming the outer layer 22 is formed from a nonplanar skin. The nonplanar skin may include a plurality of dimples that form a nonplanar surface. The dimpled surface overall may have a generally planar configuration. The nonplanar skin may be formed from a plurality of planar surfaces 46 coupled together at obtuse angles relative to the inner layer 16. In particular, the planar surfaces 46 may be formed from a plurality of triangular shaped planar surfaces 46 coupled together such that each of the plurality of triangular shaped planar surfaces 46 is positioned at a different angle than adjacent triangular shaped planar surfaces 46 relative to the inner layer 16. The planar surfaces 46 may also be formed from rectangular shaped members or other appropriately shaped members.

The pedestals 42 may configured to have any appropriate configuration and cross-sectional shape. The pedestals 42 may be positioned such that the pedestals 42 contact valleys 48 formed by the plurality of planar surfaces 46. As such, the ridges 50 may bend outwardly when the outer layer 18 undergoes thermal expansion during operation of the turbine engine in which the outer layer 18 is heated to temperatures greater than the inner layer 16. The plurality of pedestals 42 may be positioned such that the pedestals 42 contact ridges 50 formed by the plurality of planar surfaces. As such, the valleys 48 may bend inwardly when the outer layer 18 undergoes thermal expansion during operation of the turbine engine in which the outer layer 18 is heated to temperatures greater than the inner layer 16.

In another embodiment, the compliant layer 44 may be formed from a plurality of concave and convex surfaces 52, 54 coupled together in an alternating manner, as shown in FIG. 4, such that the concave and convex surfaces 52, 54 together form a generally flat surface. The support structure 22 may be formed from a plurality of pedestals 42. The plurality of pedestals 42 may be positioned such that the pedestals 42 contact ridges 50 formed by the convex surfaces 54. The outer lay 18, in at least one embodiment, may be covered with a thermal boundary layer (TBC) to provide for a generally smooth, planar surface that is exposed to the hot gas path.

Figure 5:
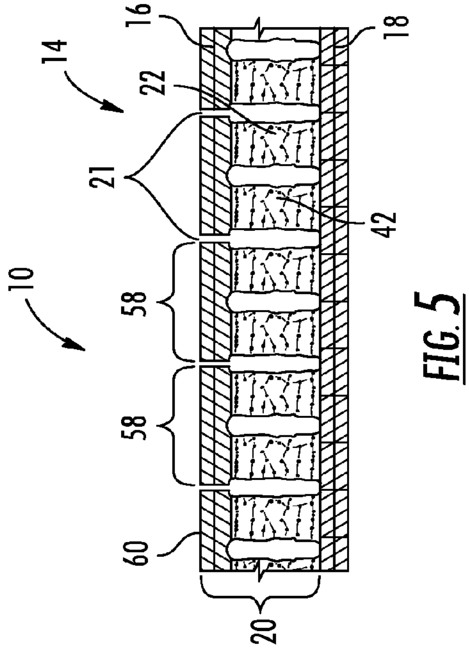
FIG. 5 is a detailed cross-sectional view of an alternative embodiment of the dual wall of FIG. 2 taken at detail 3-3 in FIG. 2.
Figure 6:
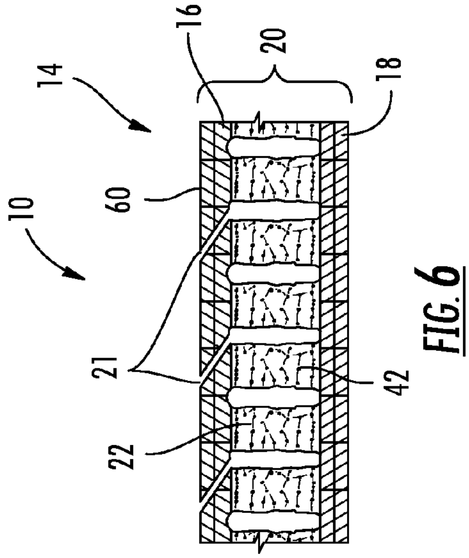
FIG. 6 is a detailed cross-sectional view of an alternative embodiment of the dual wall of FIG. 2 taken at detail 3-3 in FIG. 2.

In another embodiment, as shown in FIGS. 5 and 6, the outer layer 18 may include a plurality of slots 21 to limit stress buildup in the outer layer 18 due to thermal expansion. The slots 21 may have any appropriate configuration. In particular, the slots 21 may be configured to limit intrusion of the hot gases into the dual wall 20 as much as possible. To that end, the slots 21 may have a narrow width. As shown in FIGS. 5 and 6, at least a portion of the slots 21 may be linear. The slots 21 may be aligned with each other. The slots 21 may be positioned such that the outer layer 18 extends uninterrupted between pairs 58 of adjacent pedestals 42. The slots 21 may be positioned between pairs 58 of pedestals 42. As shown in FIG. 6, at least a portion of the slots 21 may be nonorthogonal to an outer surface 60 of the outer layer 18. As such, entry of the hot gases into the slots 21 may be discouraged and limited.

During use, the turbine airfoil 10 may be exposed to the hot gases in the hot gas path of the turbine engine. The outer layer 18 of the airfoil 10 heats up and undergoes thermal expansion. The outer layer 18 expands differently than the inner layer 16 because the outer layer 18 is separated from the inner layer 16, thereby allowing the outer layer 18 to become hotter than the inner layer 16. The configuration of the outer layer 18 allows the outer layer 18 to move relative to the inner layer 16, thereby preventing the formation of stress within the dual wall 20 between the inner and outer layers 16, 18. In particular, the outer layer 18 shown in FIG. 3 enables the valleys 48 to move inwardly in embodiments in which the ridges 50 are supported with pedestals 42 and enables the ridges 50 to move outwardly in embodiments in which the valleys 48 are supported with pedestals 42. In the embodiment shown in FIG. 4, the pedestals 42 may be attached to the ridges 50 of the convex surfaces 54 of the outer layer 18. As such, the valleys 48 are permitted to expand inwardly due to thermal expansion. In the embodiments shown in FIGS. 5 and 6, the outer layer 18 may expand laterally toward each other in the slots 21 without restriction and may thermally expand radially outward without restriction as well. Thus, little, if any, stress is created within the outer layer 18.

The foregoing is provided for purposes of illustrating, explaining, and describing embodiments of this invention. Modifications and adaptations to these embodiments will be apparent to those skilled in the art and may be made without departing from the scope or spirit of this invention.

We claim:

1. A turbine component, comprising:

a dual wall is formed from an outer layer and an inner layer separated from the outer layer by a support structure that allows the outer and inner layers to move relative to each other thereby reducing the buildup of stress between the layers;

wherein the outer layer is formed from a compliant layer configured to distort during thermally expansion.

2. The turbine component of claim 1, wherein the turbine component is a turbine airfoil formed from a generally elongated hollow airfoil formed from an outer dual wall, and having a leading edge, a trailing edge, a pressure side, a suction side, an outer endwall at a first end, an inner endwall at a second end opposite the first end, and a cooling system positioned in the generally elongated airfoil formed by the outer dual wall.

3. The turbine component of claim 1, wherein the compliant layer forming the outer layer is formed from a nonplanar skin.

4. The turbine component of claim 3, wherein the nonplanar skin is formed from a plurality of planar surfaces coupled together at obtuse angles relative to the inner layer.

5. The turbine component of claim 4, wherein the plurality of planar surfaces is formed from a plurality of triangular shaped planar surfaces coupled together such that each of the plurality of triangular shaped planar surfaces is positioned at a different angle than adjacent triangular shaped planar surfaces relative to the inner layer.

6. The turbine component of claim 4, wherein the support structure is formed from a plurality of pedestals.

7. The turbine component of claim 6, wherein the plurality of pedestals are positioned such that the pedestals contact valleys formed by the plurality of planar surfaces.

8. The turbine component of claim 6, wherein the plurality of pedestals are positioned such that the pedestals contact ridges formed by the plurality of planar surfaces.

9. The turbine component of claim 3, wherein the compliant layer is formed from a plurality of concave and convex surfaces coupled together.

10. The turbine component of claim 9, wherein the support structure is formed from a plurality of pedestals.

11. The turbine component of claim 10, wherein the plurality of pedestals are positioned such that the pedestals contact ridges formed by the convex surfaces.

12. The turbine component of claim 1, wherein the support structure is formed from a plurality of pedestals and the outer layer includes a plurality of slots to limit stress buildup in the outer layer due to thermal expansion.

13. The turbine component of claim 12, wherein at least a portion of the slots are linear and are aligned with each other.

14. The turbine component of claim 13, wherein the slots are positioned such that the outer layer extends uninterrupted between pairs of adjacent pedestals and the slots are positioned between pairs of pedestals.

15. The turbine component of claim 11, wherein at least a portion of the slots are nonorthogonal to an outer surface of the outer layer.

16. A turbine airfoil, comprising:

a generally elongated hollow airfoil formed from an outer dual wall, and having a leading edge, a trailing edge, a pressure side, a suction side, an outer endwall at a first end, an inner endwall at a second end opposite the first end, and a cooling system positioned in the generally elongated airfoil formed by the outer dual wall;

wherein the dual wall is formed from an outer layer and an inner layer separated from the outer layer by a support structure that allows the outer and inner layers to move relative to each other thereby reducing the buildup of stress between the layers;

wherein the support structure is formed from a plurality of pedestals;

wherein the outer layer is formed from a compliant layer configured to distort during thermally expansion;

wherein the compliant layer forming the outer layer is formed from a nonplanar skin.

17. The turbine airfoil of claim 16, wherein the nonplanar skin is formed from a plurality of planar surfaces coupled together at obtuse angles relative to the inner layer, wherein the plurality of planar surfaces is formed from a plurality of triangular shaped planar surfaces coupled together such that each of the plurality of triangular shaped planar surfaces is positioned at a different angle than adjacent triangular shaped planar surfaces relative to the inner layer.

18. The turbine airfoil of claim 16, wherein the compliant layer is formed from a plurality of concave and convex surfaces coupled together and wherein the support structure is formed from a plurality of pedestals that are positioned such that the pedestals contact ridges formed by the convex surfaces.

19. A turbine airfoil, comprising:

a generally elongated hollow airfoil formed from an outer dual wall, and having a leading edge, a trailing edge, a pressure side, a suction side, an outer endwall at a first end, an inner endwall at a second end opposite the first end, and a cooling system positioned in the generally elongated airfoil formed by the outer dual wall;

wherein the dual wall is formed from an outer layer and an inner layer separated from the outer layer by a support structure that allows the outer and inner layers to move relative to each other thereby reducing the buildup of stress between the layers;

wherein the outer layer is formed from a compliant layer configured to distort during thermally expansion;

wherein the support structure is formed from a plurality of pedestals and the outer layer includes a plurality of slots to limit stress buildup in the outer layer due to thermal expansion.

20. The turbine airfoil of claim 19, wherein at least a portion of the slots are linear, are aligned with each other, are nonorthogonal to an outer surface of the outer layer and are positioned such that the outer layer extends uninterrupted between pairs of adjacent pedestals and the slots are positioned between pairs of pedestals.

* * * * *